2,965,683

PROCESS FOR THE PREPARATION OF AN ALIPHATIC CHLOROFLUOROCARBON

Charles F. Baranauckas, William E. Ashton, and Samuel Gelfand, Niagara Falls, N.Y., assignors to Hooker Chemical Corporation, Niagara Falls, N.Y., a corporation of New York No Drawing. Filed Aug. 13, 1956, Ser. No. 603,823

7 Claims. (Cl. 260—653.8)

The present invention relates to the art of fluorinating a chlorofluorocarbon and is more particularly concerned with the process for the replacement of chlorine by fluorine to produce 2,2,3-trichloroheptafluorobutane, employing a fluorinating agent selected from the group consisting of cobalt trifluoride and silver difluoride.

Trichloroheptafluorobutane has been described by Henne, JACS, vol. 70, page 132. The method of Henne involves the heating of a mixture of $$CCl_2=CCl-CF_2-CF_3$$

and $CF_2=CCl-CF_2-CCl_3$ with antimony trifluorodichloride at a temperature of about 200 degrees centigrade, under a pressure of about 265 pounds per square inch, for several hours. The reaction mechanism by which the trichloroheptafluorobutane can be obtained from either $CCl_2=CCl-CF_2-CF_3$ or $CF_2=CCl-CF_2-CCl_3$ has not been elucidated. To those skilled in the art it is apparent that many different routes are possible involving such reactions as allylic shifts of chlorine and fluorine, halogen exchange, rearrangement of double bonds, fluorination by substitution, addition fluorination to mention a few. The fact that only a 53 percent yield was realized by Henne is supporting evidence that this reaction is neither simple or clean cut.

It is therefore an object of the present invention to provide a simple and direct process for the production of 2,2,3-trichloroheptafluorobutane from readily available starting materials, in high yields.

We have now found, contrary to the prior art teaching of using cobalt trifluoride and silver difluoride as fluorinating agents for the effective replacement of a plurality of chlorine atoms attached to carbon in an organic compound, that under the conditions of this invention, namely controlled reaction temperature and contact time, cobalt trifluoride and silver difluoride can be employed as a fluorinating agent to replace a single chlorine atom in the compound 2,2,3,3-tetrachlorohexafluorobutane to produce in high yield 2,2,3-trichloroheptafluorobutane. In contradiction to the prior art we have obtained yields above 75 percent by a direct process involving only the substitution of a single chlorine atom by fluorine in said specific starting compound.

In the following specific examples, the reactions were accomplished at atmospheric pressure by passing vaporized 2,2,3,3-tetrachlorohexafluorobutane through a flow meter and then through a reactor consisting of a one and one-half inch diameter vertically supported nickel pipe four feet in length which was provided with suitable means for maintaining the temperature in the desired range and determining the temperature of the reactor contents. The reactor outlet was connected with a condenser to collect the desired product. The fluorinating agent was supported on a layer of Raschig rings and maintained at a height of two feet within the reactor. In order to prevent channeling of the feed flow in the bed of fluorinating agent, nitrogen was passed through at a fast enough rate to loosen the material and provide uniform flow through the bed. After the temperature of the reactor and the auxiliary equipment were brought to equilibrium at the desired level, the flow of starting material was begun and the rate was adjusted to the desired level by altering the pressure of nitrogen on the feed system. The feed flow rates and temperature readings were determined every fifteen minutes and recorded. Material collected in the receivers was combined and fractionated through a four foot, helix packed, heated column. The product 2,2,3-trichloroheptafluorobutane has a boiling point range of 96 to 97.5 degrees centigrade and a refractive index $N_D^{20}$ 1.3525±0.0002 and has been known for some time to possess desirable qualities as a stable heat-transfer medium. The by-products that have been isolated and identified are $CF_3CFClCFClCF_3$, $CF_3CCl=CClCF_3$, $CF_3-CCl=CF-CF_3$, and $CF_3CCl_3$.

The following table shows results of typical runs using the equipment described herein before with the exception of Example 6 wherein a batch process was employed.

Table

| Exp. No. | Average Flow Rate, gms./hr. | Contact Time, sec. | Average Temperature, °C. | Catalyst | Conversion of $C_4Cl_4F_6$, Percent | Yield of $C_4Cl_3F_7$, Percent |
|---|---|---|---|---|---|---|
| 1 | 56 | 100 | 295 | $CoF_3$ | 23.2 | 67 |
| 2 | 34 | 139 | 293 | $AgF_2$ | 37.2 | 60.3 |
| 3 | 54 | 100 | 310 | $CoF_3$ | 32.0 | 79 |
| 4 | 54 | 100 | 330 | $CoF_3$ | 50.0 | 80.2 |
| 5 | ¹41 | 179 | 360 | $CoF_3$ | 68.8 | 52.6 |
| 6 | batch | 2 hrs | 300 | $CoF_3$ | 73.7 | 29.4 |
| 7 | 168 | 33 | 295 | $CoF_3$ | 9.8 | 74.5 |

¹ Catalyst bed—1 foot.

It is critical that the temperature of the reaction medium be maintained between about 250 degrees and about 375 degrees centigrade to obtain optimum yields although temperatures between about 290 degrees and about 360 degrees centigrade are generally preferred. When employing temperatures as low as 250 degrees centigrade or below the percent conversion per pass is low and uneconomical. At temperatures above about 375 degrees centrigrade further fluorination of 2,2,3-trichloroheptafluorobutane occurs resulting in the formation of $CF_3CFClCFClCF_3$ thus reducing the yield of the desired product.

The contact time of the tetrachlorohexafluorobutane starting material with the fluorinating agent may be varied to some extent without noticeable sacrifice of advantageous high efficiency of operation. However, if contact time is excessive, the capacity of the reactor is low thereby causing economic disadvantages in the operation. On the other hand, if contact time is too short, the reaction of starting material to form desired product may be incomplete thereby entailing high cost of recovering and recycling unreacted material to subsequent operation. Accordingly, the time of contact is determined by balancing the economic advantage of high reactor throughput obtained at short contact times against the cost of recovery of unreacted starting material. It has been found that to obtain optimum conditions, passage of the 2,2,3,3-tetrachlorohexafluorobutane in contact with the catalyst should be controlled to effect a residence or contact time of less than 30 minutes (1800 seconds) although periods of from 30 seconds to about 300 seconds are preferred. These residence times can be used for any type of system contemplated, i.e. fluid or non-fluid bed in a fixed or moving bed system and for any physical form of catalyst.

An advantage of this invention is that atmospheric pressure may be used as shown in the above examples;

however, pressures either higher or lower than atmospheric pressure may be employed. Either a continuous or a batch process of fluorination should prove satisfactory, and unconverted 2,2,3,3-tetrachlorohexafluorobutane may be recycled to raise the efficiency of the overall process.

The physical form of the fluorinating agent, cobalt trifluoride and silver difluoride is preferably such that easy penetration of the mass of the fluorinating agent by gases or vapors passing through the reaction vessel is facilitated. Granulated or coarsely powdered fluorinating agent has been found to be satisfactory.

The reactors, which may be of iron, nickel or other material resistant to the reactants and reaction products under the conditions of fluorination and regeneration, is maintained at a desired reaction temperature by any convenient means. Heating may be effected in any one of a number of ways, such as by electrical resistance heaters or by immersing the reaction vessel in a suitable high-boiling liquid.

It is to be understood that the above-described examples are simply illustrative of the application of the principles of the invention. Numerous other modifications may be readily devised by those skilled in the art which will embody the principles of the invention and fall within the spirit and scope thereof.

We claim:

1. In a process for making 2,2,3-trichloroheptafluorobutane, the steps which include: passing 2,2,3,3-tetrachlorohexafluorobutane into a reaction zone containing a fluorinating agent selected from the group consisting of cobalt trifluoride and silver difluoride while maintaining the temperature of the reaction zone between about 250 degrees and 375 degrees centigrade for a contact time of less than 30 minutes.

2. The process of claim 1 wherein the fluorinating agent is silver difluoride.

3. The process of claim 1 wherein the fluorinating agent is cobalt trifluoride.

4. In a process for making 2,2,3-trichloroheptafluorobutane, the steps which include: passing 2,2,3,3-tetrachlorohexafluorobutane into a reaction zone containing a fluorinating agent selected from the group consisting of cobalt trifluoride and silver difluoride while maintaining the temperature of the reaction zone between about 250 degrees and 375 degrees centigrade for a contact time of between about 30 seconds and 300 seconds.

5. In a process for making 2,2,3-trichloroheptafluorobutane, the steps which include: passing 2,2,3,3-tetrachlorohexafluorobutane into a reaction zone containing a fluorinating agent selected from the group consisting of cobalt trifluoride and silver difluoride while maintaining the temperature of the reaction zone between about 290 degrees and 360 degrees centigrade for a contact time of less than 30 minutes.

6. In a process for making 2,2,3-trichloroheptafluorobutane, the steps which include: passing 2,2,3,3-tetrachlorohexafluorobutane into a reaction zone containing a fluorinating agent selected from the group consisting of cobalt trifluoride and silver difluoride while maintaining the temperature of the reaction zone between about 290 degrees and 360 degrees centigrade for a contact time between about 30 seconds and 300 seconds.

7. In a process for making 2,2,3-trichloroheptafluorobutane, the steps which include: passing 2,2,3,3-tetrachlorohexafluorobutane into a reaction zone containing cobalt trifluoride while maintaining the temperature of the reaction zone between about 290 degrees and 360 degrees centigrade for a contact time between about 30 seconds and 300 seconds.

References Cited in the file of this patent

UNITED STATES PATENTS

| | | |
|---|---|---|
| 2,568,660 | Rosen | Sept. 18, 1951 |
| 2,578,721 | McBee et al. | Dec. 18, 1951 |
| 2,759,026 | McCleary | Aug. 14, 1956 |